(12) United States Patent
Robertson et al.

(10) Patent No.: US 8,065,345 B2
(45) Date of Patent: Nov. 22, 2011

(54) VISUALIZATION AS INPUT MECHANISM

(75) Inventors: George G. Robertson, Seattle, WA (US); Jason D. Carlson, Redmond, WA (US); Brian Scott Ruble, Bellevue, WA (US); Sean Michael Boon, Snoqualmie, WA (US); Jakob Peter Nielsen, Redmond, WA (US); David E. Heckerman, Bellevue, WA (US); Joshua W. Lee, Englewood, NJ (US); Christian Bernd Schormann, Seattle, WA (US); Barry James Givens, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 324 days.

(21) Appl. No.: 12/365,834

(22) Filed: Feb. 4, 2009

(65) Prior Publication Data

US 2010/0198787 A1 Aug. 5, 2010

(51) Int. Cl.
*G06F 17/30* (2006.01)
(52) U.S. Cl. ........ 707/805; 707/610; 707/781; 707/802; 715/700; 715/866
(58) Field of Classification Search .................. None
See application file for complete search history.

(56) References Cited

U.S. PATENT DOCUMENTS

| | | | |
|---|---|---|---|
| 4,674,043 A | | 6/1987 | Hernandez et al. |
| 5,414,809 A | * | 5/1995 | Hogan et al. .................. 715/765 |
| 5,619,631 A | | 4/1997 | Schott |
| 5,706,453 A | * | 1/1998 | Cheng et al. .................. 715/809 |
| 5,950,190 A | * | 9/1999 | Yeager et al. .......................... 1/1 |
| 5,990,888 A | * | 11/1999 | Blades et al. ................. 715/764 |
| 6,021,215 A | | 2/2000 | Kornblit et al. |
| 6,188,403 B1 | * | 2/2001 | Sacerdoti et al. ............. 715/764 |
| 6,211,887 B1 | | 4/2001 | Meier et al. |
| 6,222,540 B1 | * | 4/2001 | Sacerdoti ..................... 345/581 |
| 6,489,970 B1 | | 12/2002 | Pazel |
| 6,529,900 B1 | | 3/2003 | Patterson et al. |
| 7,305,565 B1 | * | 12/2007 | Lungaro et al. ............... 713/189 |
| 7,496,852 B2 | * | 2/2009 | Eichorn et al. ................ 715/764 |
| 7,734,576 B2 | * | 6/2010 | Simon et al. .................. 707/602 |
| 7,747,571 B2 | * | 6/2010 | Boggs ........................... 707/613 |
| 2002/0158898 A1 | * | 10/2002 | Hsieh et al. ................... 345/736 |
| 2006/0184673 A1 | * | 8/2006 | Liebman ....................... 709/225 |
| 2006/0271885 A1 | * | 11/2006 | Pittendrigh et al. .......... 715/856 |
| 2007/0165031 A1 | | 7/2007 | Gilbert et al. |

OTHER PUBLICATIONS

Klimis Symeonidis, "Hand Gesture Recognition Using Neural Networks", School of Electronic and Electrical Engineering, 2000.*
Matsushita, et al. Interactive Visualization Method for Exploratory Data Analysis. 0-7695-1195-3/01 IEEE http://ieeexplore.ieee.org/stamp/stamp.jsp?arnumber=00942128. Last accessed Nov. 17, 2008, 6 pages.
Baudel. From Information Visualization to Direct Manipulation: Extending a Generic Visualization Framework for the Interactive Editing of Large Datasets. UIST'06, Oct. 15-18, 2006, Montreux, Switzerland. ACM 1-59593-313-1/06/0010. http://delivery.acm.org/10.1145/1170000/1166265/p67-baudel.pdf?key1=1166265&key2=0483296221&coll=GUIDE&dl=GUIDE&CFID=11245030&CFTOKEN=92103697. Last accessed.

* cited by examiner

*Primary Examiner* — Apu Mofiz
*Assistant Examiner* — Hung Le
(74) *Attorney, Agent, or Firm* — Lee & Hayes, PLLC

(57) ABSTRACT

A visualization input system is provided. The system includes a visualization component that receives input gestures from a user (or users) and translates the gestures into one or more data manipulation commands. A distribution component receives the data manipulation commands and propagates data modifications across one or more databases in view of the commands. This includes a rights component that enables the data modifications to be implemented across the one or more databases.

20 Claims, 10 Drawing Sheets

VISUALIZATION AS INPUT MECHANISM

BACKGROUND

Data visualization refers to the visual representation of data, defined as information which has been abstracted in some schematic form, including attributes or variables for the units of information. With the rapid increase of computing power, larger and more complex numerical models for visualization have been developed, resulting in the generation of huge numerical data sets. Also, large data sets were generated by data acquisition devices such as medical scanners and microscopes, where data has been collected in large databases containing text, numerical information, and multimedia information. Thus, advanced computer graphics techniques were needed to process and visualize such data sets.

Visualization is often considered a part of a process of scientific computing that includes the use of computer modeling and simulation in scientific and engineering practice. More recently, visualization has increasingly been concerned with data from other sources, including large and heterogeneous data collections found in business and finance, administration, digital media, and so forth. A new research area called Information Visualization was launched in the early 1990s, to support analysis of abstract and heterogeneous data sets in many application areas.

Generally, data visualization is an evolving concept where definitional boundaries are continually expanding and, as such, is best defined in terms of loose generalizations. It refers to the more technologically advanced techniques, which allow visual interpretation of data through the representation, modeling and display of solids, surfaces, properties and animations. This involves the use of graphics, image processing, computer vision, and user interfaces. Data visualization also encompasses a much broader range of techniques than specific techniques such as solid modeling, for example. The success of data visualization is due to the soundness of the basic idea behind the technology including the use of computer-generated images to gain insight and knowledge from data and its inherent patterns and relationships. A second premise is the utilization of the broad bandwidth of the human sensory system in steering and interpreting complex processes, and simulations involving data sets from diverse scientific disciplines having large collections of abstract data from many sources. These concepts are important and have a profound and widespread impact on the methodology of computational science and engineering, as well as on management and administration.

The interplay between various application areas and specific problem solving visualization techniques has been the focus of much research and innovation. One area involves the interaction between humans and a generated visualization. For example, if a data visualization of a chart or graph were projected on to a surface, how could a human being interact with the projection and more importantly, what would be the consequences of such interaction. For instance, if a projected chart were manipulated in such a manner as to cause a change in a data relationship that was currently displayed. Present systems would require manual intervention to analyze the suggested change, locate the data source to update the respective change, and to finally manually update the data source with the proposed change. As can be appreciated, these processes for effecting changes in a data structure or relationship are highly inefficient.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Visualization components are provided that allows users to manipulate a given visualization in real time and automatically propagate data changes resulting from such gestures across multiple databases. A visualization component receives user gestures such as hand signals or audio feedback directed toward a given visualization(s) and generates one or more data manipulation commands. For example, a command may be generated by a user dragging a node on a chart that causes the configuration of the chart to change. The change is reflected in the manipulation command that is also processed by a rights component to determine whether or not the respective user has permission to change the visualization display in the requested manner. If permission is properly obtained, a distribution component utilizes the manipulation commands to propagate the changes across a plurality of databases if necessary. A feedback component can also be provided to generate some indication back to the user regarding their respective rights when requesting a particular change to the visualization. Visualizations can be manipulated from substantially any form including data displays, charts, graphs, images, video, audio, and so forth.

Various visualization processes can be employed to update data. In one specific example, an organizational chart could be employed as the visualization where one can manipulate data in the chart without having to drill down to another form in another application to update the chart. Thus, visualization is employed as the input medium for persisting data back to the source data such as a chart or other visualization that is displayed. Instead of going into a subsequent form to update the chart, the visualization automatically propagates the change (e.g., change the parental relationship on the chart itself and have that change automatically persist back to the original database or source or update a name or a title in the chart and have that automatically persist back to the system). Another feature is employing directed information of data within the visualization. Thus, if one drags (or other gesture) on a bar, processes can determine where or how the system applies the data. This can also apply to using atomic pieces of data in addition to aggregate data. For example, two or more visualizations can be combined (wholly or in part), where the respective combination is propagated back to the databases for update (assuming rights exist for the combination). This applies not only to writing back to instance data but also changing an underlying model itself (e.g., the manner in which data is viewed). Thus, gestures can be employed to change underlying viewing models of presentation, where changes may be specific or globally applied.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods enable users to manipulate data visualizations and automatically propagate data changes from the manipulation across multiple databases. In one aspect, a visualization input system is provided. The system includes a visualization component that receives input gestures from a user (or users) and translates the gestures into one or more data manipulation commands. A distribution component receives the data manipulation commands and propagates data modifications across one or more databases in view of the commands. This includes a rights component that enables the data modifications to be implemented across the one or more databases. A feedback component can be provided to indicate whether or not a user has rights to initiate a desired data modification.

As used in this application, the terms "component," "distribution," "rights," "visualization," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
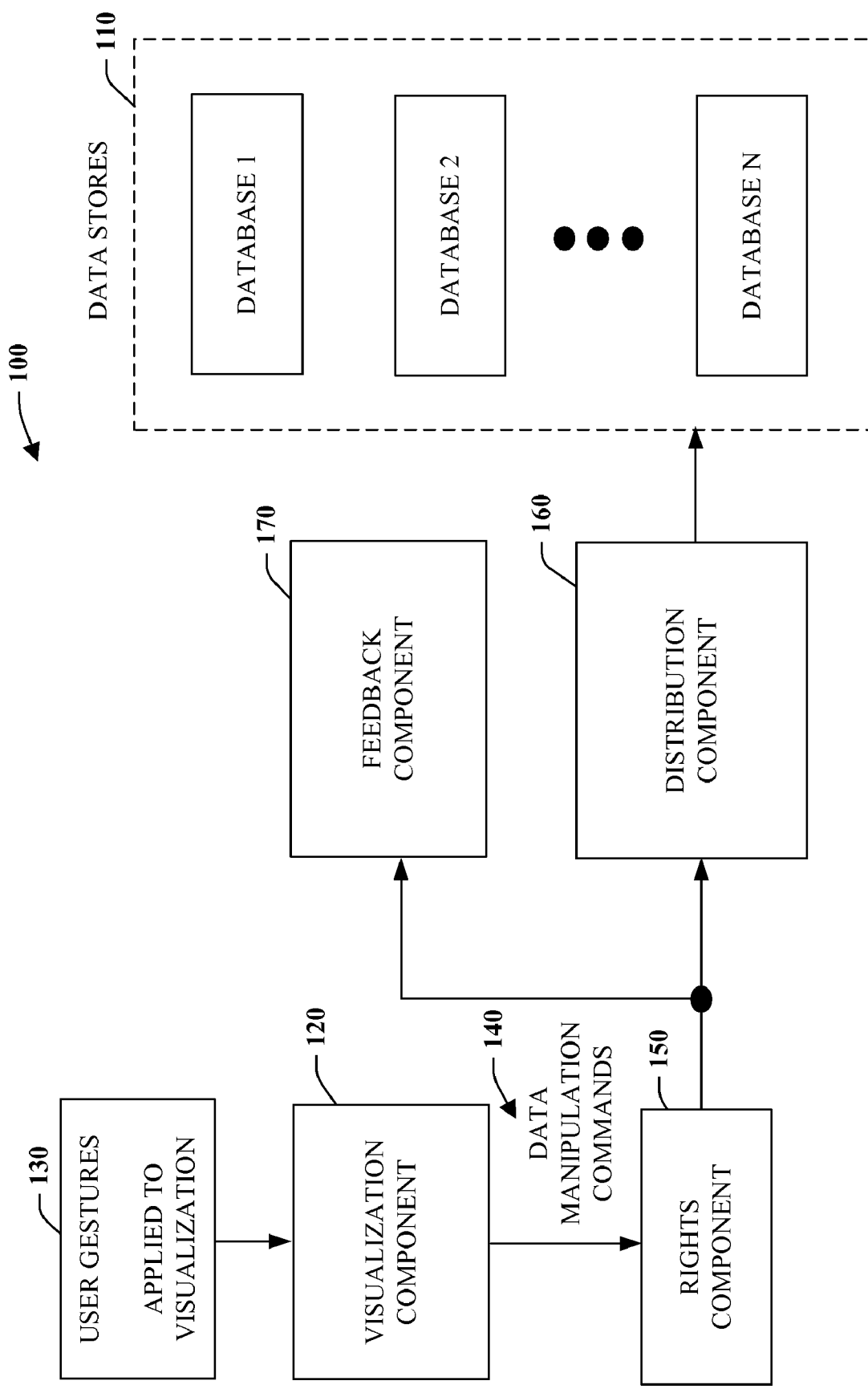
FIG. 1 is a schematic block diagram illustrating a system that employs visualizations as input and to initiate subsequent data distribution.

Referring initially to FIG. 1, a system 100 employs visualizations as input and to initiate subsequent data distribution. The system 100 includes various components that allow users to manipulate a given visualization in real time and automatically propagate data changes resulting from such gestures across multiple databases 110. A visualization component 120 receives user gestures 130 such as hand signals or audio feedback directed toward a given visualization(s) (not shown) and generates one or more data manipulation commands 140. For example, a command 140 may be generated by a user dragging a node on a chart that causes the configuration of the chart to change. An audio command may direct a visualization to switch node A with node B, for example. The change is reflected in the manipulation command 140 that is also processed by a rights component 150 to determine whether or not the respective user has permission to change the visualization display in the requested manner. If permission is properly obtained from the rights component 150, a distribution component 160 utilizes the manipulation commands 140 to propagate the changes across a plurality of databases 110, if necessary.

A feedback component 170 can also be provided to generate some indication back to the user regarding their respective rights when requesting a particular change to the visualization. For example, the user may attempt to manipulate a given visualization. The rights component 150 may detect that rights for the respective manipulation are not present and thus signal the feedback component 170 which can then alert the user they do not have the requisite privileges for such action. It is also possible to alert the user that even though the requested change has been visualized that the feedback component 150 can inform them that the change will not in fact be distributed to the databases 110 without further authorization which can be administratively provided or other means such as an electronic key for example. Feedback can also include callbacks to business logic (not shown) that performs user analysis for authorization and/or determination of rights per a requested action and/or user.

In yet another aspect, visualizations can be buffered in a short term cache where the visualization changes can be authorized by another party before the changes are automatically propagated to the respective databases 110. For example, if a human resources chart was manipulated by an analysis group, before company changes could be implemented in the databases, the chart would have to be approved by a supervisory member or group having authority to make such changes. In general however, if a user has rights to at least one of the databases 110, the changes represented by manipulating a given visualization can be propagated to the other databases as desired. It is to be appreciated however that partial authorization can also be established via suitable electronic policy or otherwise. Also, visualizations can be manipulated via the gestures 130 from substantially any form including data displays, charts, graphs, images, video, audio, and so forth. Gestures 120 can include speech, hand movements, mouse actions, light pen movements, and substantially any biometric indication regarding a change to a given display or data presentation.

Various visualization processes can be employed to update data. In one specific example, an organizational chart could be employed as the visualization where one can manipulate data in the chart without having to drill down to another form in another application to update the chart. Thus, visualization is employed as the input medium for persisting data back to the source data in the databases 110 such as a chart or other visualization that is displayed. Instead of going into a subsequent form to update the chart, the visualization automatically propagates the change (e.g., change the parental relationship on the chart itself and have that change automatically persist back to the original database or source or update a name or a title in the chart and have that automatically persist back to the system). Another feature is employing directed information of data within the visualization. Thus, if one drags (or other gesture) on a bar, processes can determine where or how the system 100 applies the data. This can also apply to using atomic components of data in addition to aggregate data. For example, two or more visualizations can be combined (wholly or in part), where the respective combination is propagated back to the databases for update (assuming rights exist for the combination). This applies not only to writing back to instance data but also changing an underlying model itself (e.g., the manner in which data is viewed). Thus, gestures can be employed to change underlying viewing models of presentation, where changes may be specific or globally applied.

It is to be appreciated that the above examples are not limited to charts or graphs. Visualizations can take on substantially any form depending on the underlying model defining the visualization in the databases 110. To illustrate a different example, visualizations could provide an overlay on a map of some geographical area. The overlay might show the respective sales regions for the area and the individuals responsible for the accounts in those regions. At a sales meeting, the visualization could be projected on to a wall where meeting members could manipulate the regions via gestures 130 (e.g., use light pens to define different sales areas) or the data within a given region (using speech to define who is responsible for the area). After the new sales regions have been defined, the changes can be automatically propagated to the databases 110 via the distribution component 160 if permissions are established by the rights component 150. In another case, the proposed changes can be cached and sent to another authority for authorization before the changes are distributed. Upon distribution, e-mail notifications (or other electronic communication) can be automatically generated to the sales force showing graphs of the new regions and defining the new responsibilities within the respective regions. As can be appreciated, a plurality of automated actions can be generated when data changes are distributed to the databases 110.

In yet another example, as opposed to chart, nodal or tree data structures that are visualized, an image may be the object of visualization. In one specific example, the image may be retrieved from an animation database and projected (e.g., image of a cartoon figure). A group of animators may gesture at the projected image to change it to produce differing perspectives and renderings of the image. After the group has modified the image, subsequent changes can be effected across the databases 110 to update the underlying model or data structure that represented the initial image before modification. Similar type modifications can be directed at audio portions that may be associated with the respective image (e.g., change the sound of a voice associated with the image). In another aspect, a visualization input system is provided. The system includes means for processing gestures from a visualization (e.g., visualization component 130) and means for propagating data modifications (e.g., distribution component 160) across a plurality of databases in view of changes made to the visualization. The system also includes means for enabling (e.g., rights component 150) the data modifications to be transferred to the databases.

Figure 2:
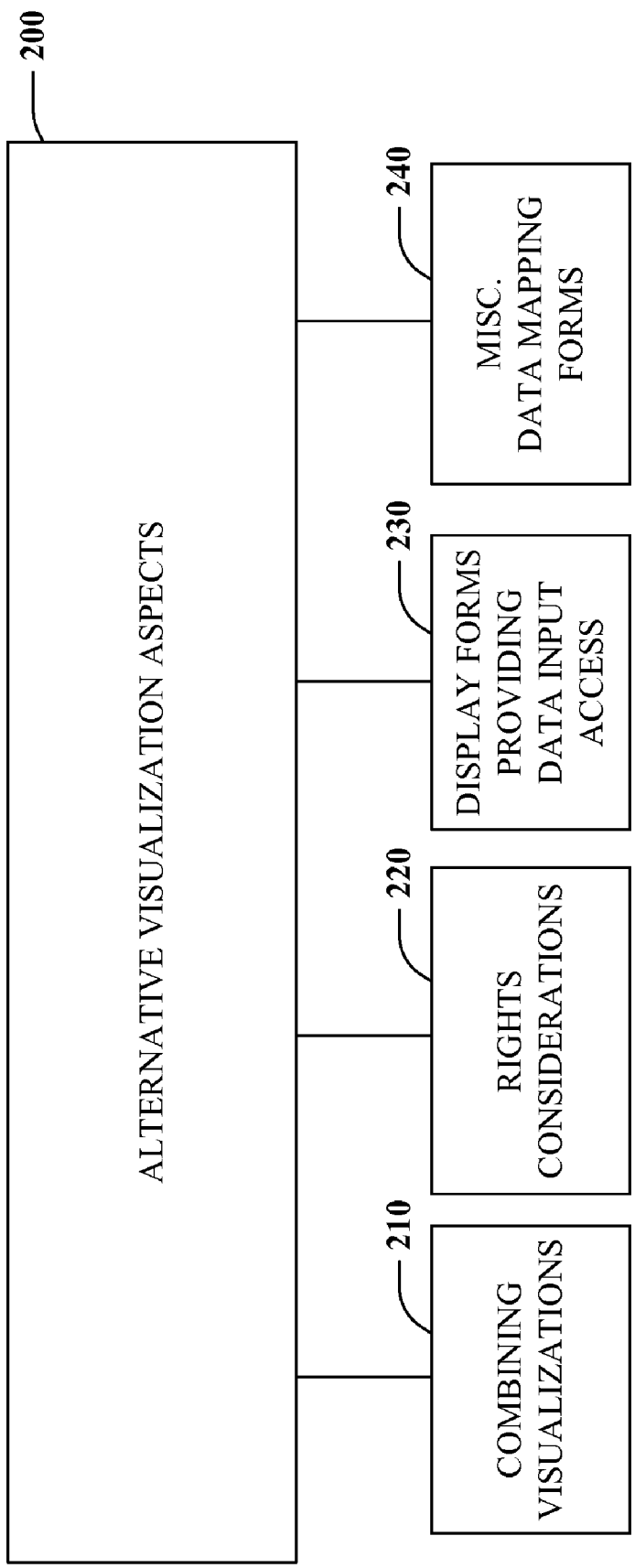
FIG. 2 is a block diagram that illustrates alternative visualization aspects.

Referring now to FIG. 2, alternative visualization aspects 200 are provided that can be employed with the systems described above. At 210, methods are provided for combining visualizations. For example, if two or more separate visualizations were displayed and a user gestured for the combination of one or more elements of the visualizations to be merged, the resultant visualization could be propagated back as a singular or combined visualization. Other aspects include mash-ups or heat maps for visualizing data, for example. Mash-ups of the world for instance with data binding and mapping between data sets, where raw data is visualized and provided as a graphical object. Visualization data sets can also be combined. For example, combining a number of ballot sheets from various countries and create new aggregations in an ad hoc manner (e.g., how would this aggregation have voted if combined). Meshing visualizations can also be employed to create a single visualization for disjoint applications. For example, heavily parameterized data and visualizations can be meshed from several different applications.

At 220, rights considerations are provided. This includes access rights to data and enabling direct manipulation. Thus, access rights are employed to alter data in multiple overlapping databases and rights can be propagated to other related databases where one does not currently have existing rights. Rights can be applied across area domains (network of databases) or limited by policy to specific changes. Direct manipulation is allowable via the rights as a function of business logic on a hosting application, for example. The hosting application can indicate that some action is allowable and operates with callbacks to other applications to determine the current state (e.g., allowed to update changes, permission denied, partial changes allowed to these nodes, and so forth).

At 230, varying display forms can be used as input mechanisms or serve to guide input reading devices. These can include multidimensional displays for example where input gestures can be derived. In one specific example, a 3D Visualization Perspective Wall could be provided where the user can gesture potential data changes. A spreadsheet for example can be a problem where the amount of data is large but not enough screen real estate is provided. Thus, expose the spreadsheet three dimensionally so that one can see fields and data in order to consume more information. Also, provide N 3d cubes visualizing where to apply changes. In yet another example, a graphical guide can be given to users to enable changes to be visualized. For example, a bar chart can be selected to show some importance for updating data and triggers a graphical goal seek to find approximations. This can expand to more than dragging a bar chart but for any type of interaction and provide a manner of updating the data. For example, a column could be expanded to illustrate a desired sales goal on the visualization, where the expanded column could then be propagated which would induce other changes in the database.

At 240, miscellaneous aspects are considered. This includes using the contours and style of shapes as visualization sources for input. For example, data may only be propagated when bound to associated mapping and geometries. Thus, data on surface of mechanical engineering part only makes sense when it is actually bound to the surface of part. This includes collecting data for a particular machine in a factory, visualizing data onto the actual geometry of interest and exploding the geometry so that one can better visualize the data, where the surface of the inspected component or machine can be used as an input mechanism to study and/or further alter data.

Figure 3:
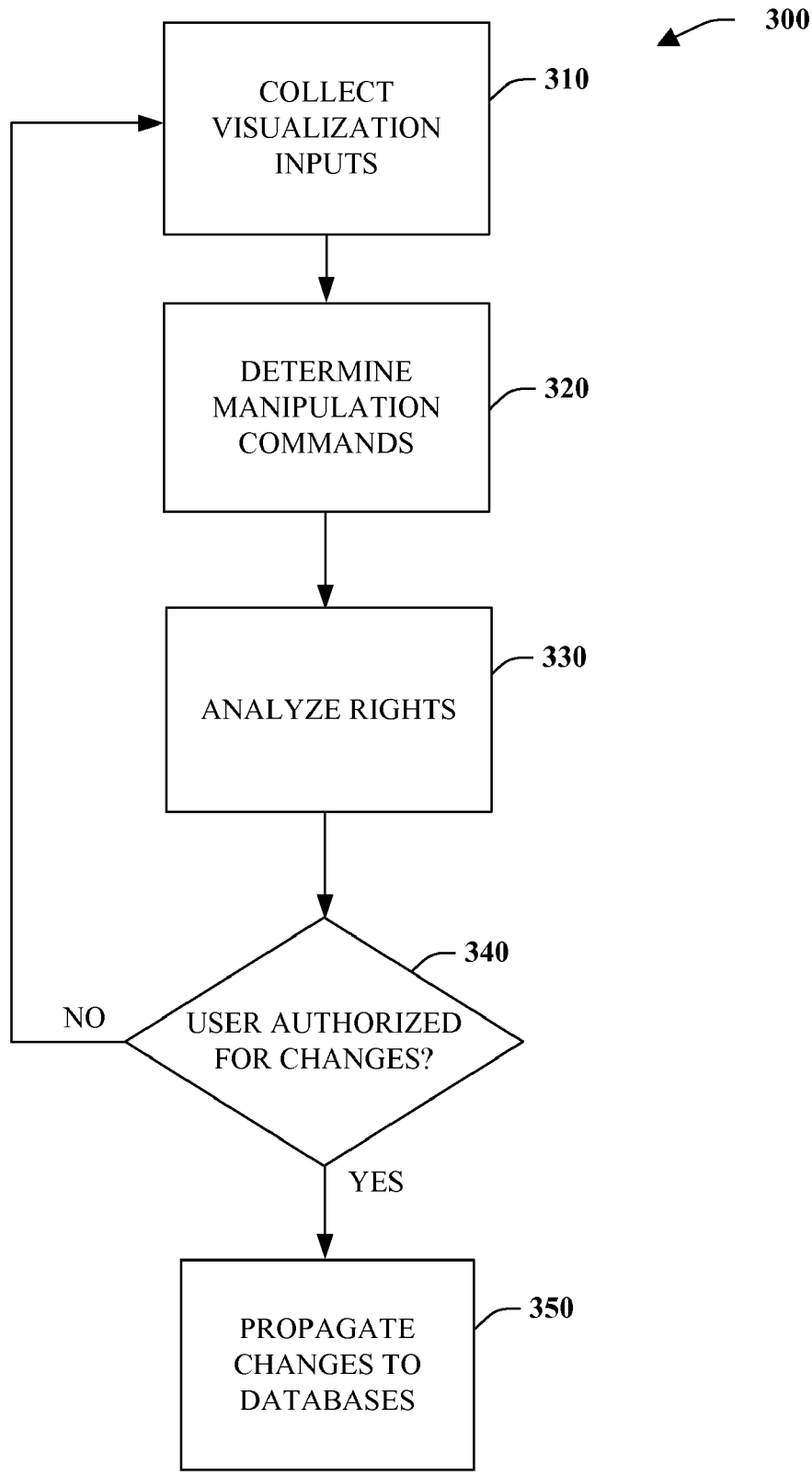
FIG. 3 is a flow diagram that illustrates a visualization input process.

Referring now to FIG. 3, a visualization input process is illustrated. While, for purposes of simplicity of explanation, the process is shown and described as a series or number of acts, it is to be understood and appreciated that the subject process is not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Turning to FIG. 3, an example process 300 is illustrated that employs visualizations as input for data change. Proceeding to 310, data is received from one or more visualization inputs. As noted previously, such data can include gestures that indicate a proposed change or alteration to a visualization (or visualizations). The gestures can include substantially any type of control or biometric indication of change that is detected at or in association with the respective visualization. At 320, from the collected gestures, one or more data manipulation commands are determined. This includes electronic information that details changes from a starting visualization to a subsequent visualization that has been altered by the user's gesture. For instance, this can include proposed model changes, graphical changes, data content changes, structural changes, dimensional changes and so forth (e.g., lengthen line between two circles, reduce size of region from X to Y, and so forth). At 330, an analysis of the data commands is performed in order to determine whether the user has rights to implement such changes across the databases. The analysis can include checking a policy database for the user's rights, checking file metadata for authorization, checking tags on data and corresponding to a user ID and so forth.

At 340, a determination is made as to whether or not a user has sufficient rights to make the requested changes. If it is determined the user has sufficient rights at 340, then the changes can be propagated at 350 to one or more other databases that contribute to generate the starting visualization. In the future, the updated visualization can be utilized to effect further changes via the input considerations described herein and associated with the respective visualization. If changes are not authorized at 340, the process proceeds back to 310 and collects visualization inputs.

Figure 4:
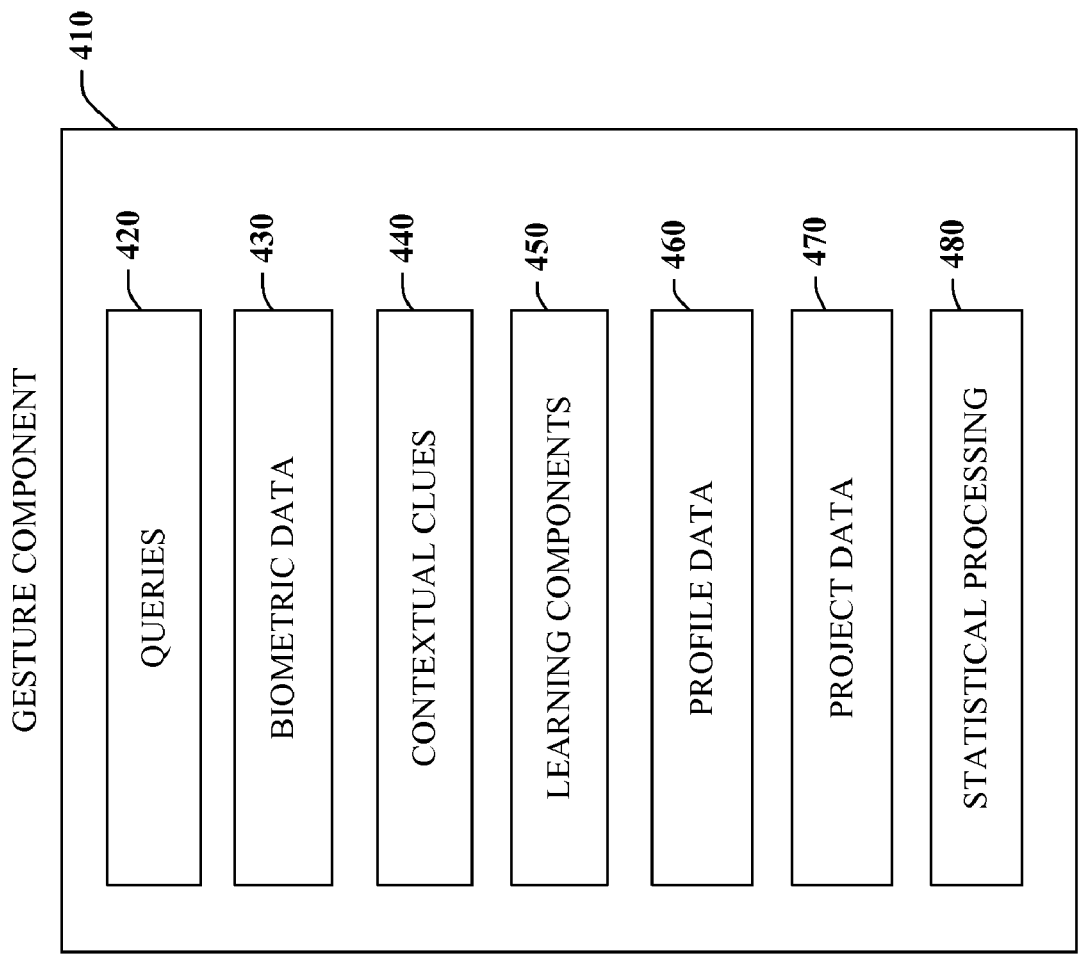
FIG. 4 illustrates a gesture component for analyzing collected user data from visualizations.

Referring now to FIG. 4, a system 400 and gesture component 410 for analyzing visualization input data is illustrated. The gesture component 410 analyzes collected data such as the visualization inputs described above. The gesture component 410 shows example factors that may be employed to analyze data to determine changes to visualizations. It is to be appreciated that substantially any component that analyzes visualization input data can be employed.

Proceeding to 420, one aspect for capturing user actions includes monitoring queries that a respective user may make during a presentation such as questions generated in a meeting or from laptop queries or other electronic media (e.g., e-mails generated from a meeting). This may include local database searches for information in relation to a given topic or slide where such query data (e.g., key words employed for search) can be employed to potentially add context to a given visualization the user may desire to view. Remote queries 420 can be processed such as from the Internet where data learned or derived from a respective query can be used to determine changes for visualization.

At 430, biometric data may be analyzed. This can include analyzing keystrokes, audio inputs, facial patterns, biological inputs, and so forth that may provide clues as to how important a given piece of data. For example, if a user were presenting a sales document for automobiles and three different competitors were concurrently analyzed, data relating to the competitors analyzed can be automatically captured by the component 410 and saved to indicate the analysis. Such data can be recovered and employed to update visualizations at the data source.

At 440, one or more contextual clues may be analyzed. Contextual clues can be any type of gesture that is captured that further indicates some nuance to a user's thoughts or goals. At 450, one or more learning components can be employed by the gesture component 410. This can include substantially any type of learning process that monitors activities over time to determine how to annotate, document, or tag data in the future. For example, a user could be monitored for such aspects as where in the visualization they analyze first, where their eyes tend to gaze, how much time they spend reading near key words and so forth, where the learning components 450 are trained over time to capture contextual nuances of the user or group. The learning components 450 can also be fed with predetermined data such as controls that weight such aspects as key words or word clues that may influence the component 410. Learning components 450 can include substantially any type of artificial intelligence component including neural networks, Bayesian components, Hidden Markov Models, Classifiers such as Support Vector Machines and so forth.

At 460, profile data can influence how data is collected and visualizations are generated. For example, controls can be specified in a user profile that guides the component 410 in its decision regarding what should and should not be included as output data with respect to a given slide or other electronic sequence. The profile can also include policy codes that authorize a given user for updating a particular piece of data or database.

At 470, substantially any type of project data can be captured and potentially used to add/alter visualizations or determine a more suitable form. This may include design notes, files, schematics, drawings, comments, e-mails, presentation slides, or other communication. This could also include audio or video data from a meeting for example where such data could be linked externally from the meeting. For example, when a particular data structure is tagged as having meeting data associated with it, a subsequent user could select the link and pull up a meeting that was conducted previously to discuss the given portion of a presentation.

At 480, substantially any type of statistical process can be employed to generate or determine gesture data 410. This can include monitoring certain types of words such as key words for example for their frequency, for word nearness or distance to other words in a paragraph (or other media), or substantially any type of statistical processes that is employed to indicate additional context for a processed application or data structure. As can be appreciated, substantially any type of data that is processed by a user or group can be aggregated at 410 and subsequently employed to alter a given visualization.

It is noted that interfaces (not shown) can be provided to facilitate capturing data and tailoring visualizations based off the captured information. This can include a Graphical User Interface (GUI) to interact with the user or other components such as any type of application that sends, retrieves, processes, and/or manipulates data, receives, displays, formats, and/or communicates data, and/or facilitates operation of the system. For example, such interfaces can also be associated with an engine, server, client, editor tool or web browser although other type applications can be utilized.

The GUI can include a display having one or more display objects (not shown) for manipulating electronic sequences including such aspects as configurable icons, buttons, sliders, input boxes, selection options, menus, tabs and so forth having multiple configurable dimensions, shapes, colors, text, data and sounds to facilitate operations with the profile and/or the device. In addition, the GUI can also include a plurality of other inputs or controls for adjusting, manipulating, and configuring one or more aspects. This can include receiving user commands from a mouse, keyboard, speech input, web site, remote web service and/or other device such as a camera or video input to affect or modify operations of the GUI.

Figure 5:
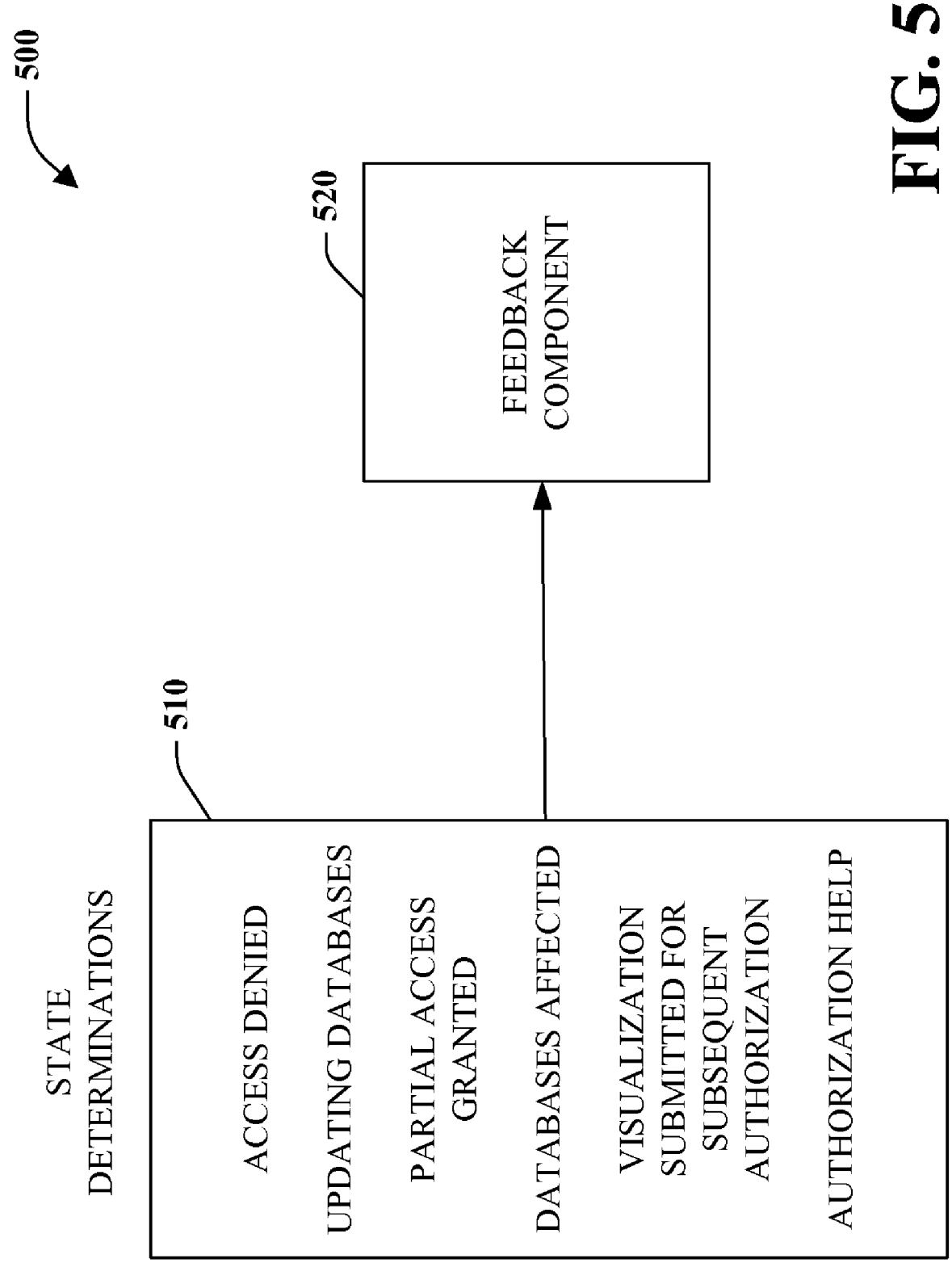
FIG. 5 illustrates example states processed by a feedback component.

Referring to FIG. 5, an exemplary system 500 illustrates example state determinations 510 that can be processed by a feedback component 520. On example state determination 510 that can be generated by the feedback component 520 includes access denied. Such state is presented to the users when it is determined they do not have suitable credential to effectuate a database update to the underlying models or data structures that define a given visualization. Another state determination includes updating databases. This is a visual cue that a requested change to the visualization is occurring. Yet another state 510 may include partial access granted. Thus, there may be portions of the visualization that the user can change and portions that may require other authorization. This may also include updating one subset of databases but not another subset. Another state 510 may include feedback 520 that lets the user know which databases have been affected or are currently being update. These types of displays can also be configurable where the respective feedback 520 is not revealed to the user if desired. In some cases, the state information 510 may indicate that a subsequent authorization is required. Thus, a temporary image of the visualization is captured and submitted for the authorization before the databases are updated. Still yet another example state 510 can include providing some indication of help or how to obtain suitable authorization. As can be appreciated, a plurality of other states and feedback can be similarly provided.

Figure 6:
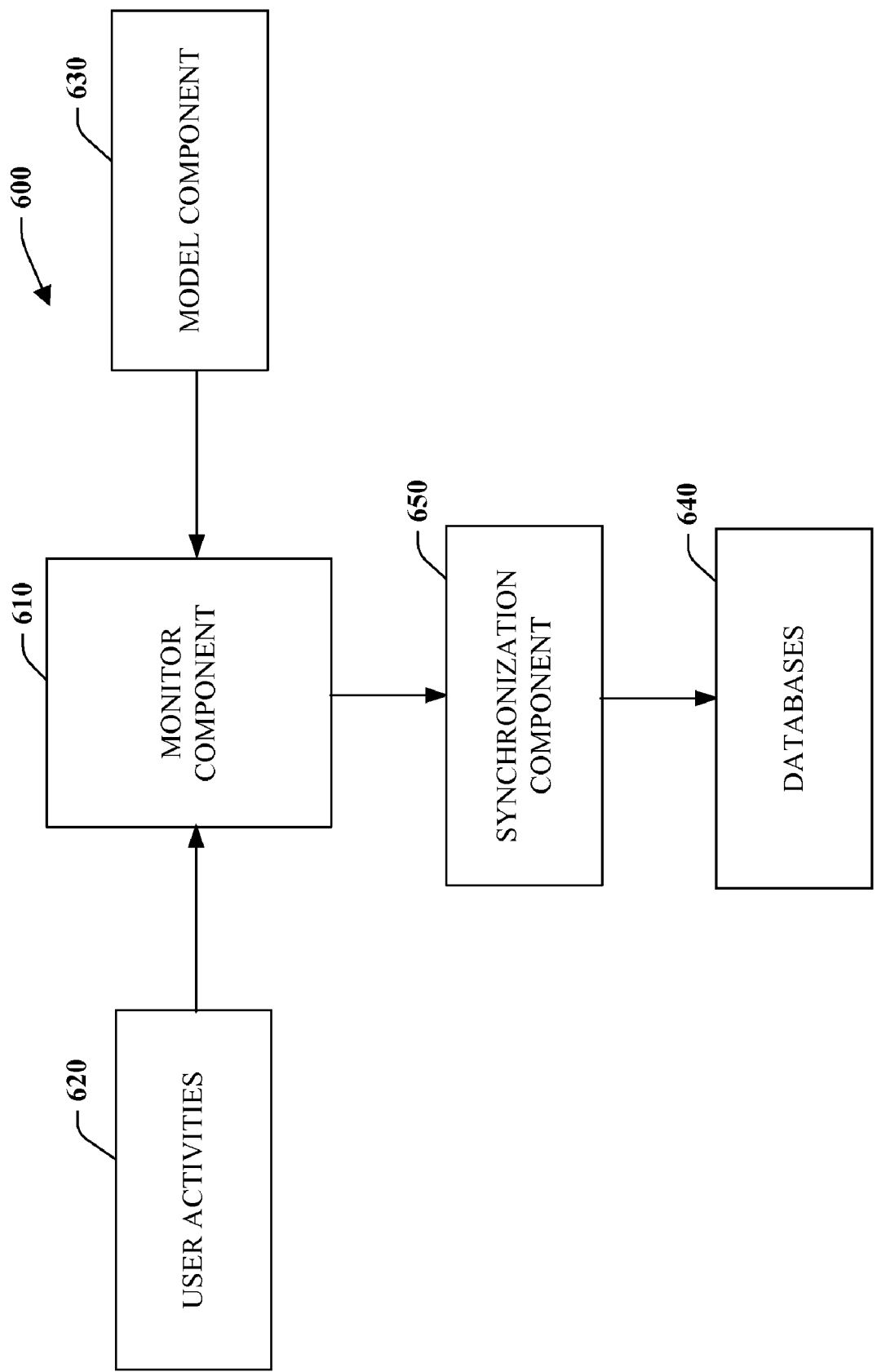
FIG. 6 illustrates data synchronization between databases and applications.

Referring to FIG. 6, a system 600 illustrates data synchronization between databases and visualization applications. A monitor or component 610 analyzes user activities 620 over time. In accordance with such monitoring, one or more model components 630 may be updated, where the models are retrieved from one or more databases 640 when rendering and operating upon a given visualization. In some cases, a change in the user activities 620 may be detected where the model component 630 is updated and/or automatically adjusted. In such cases, it may be desirable to update or synchronize one or more of the databases 640 that store the previous version of the models. For example, other data structures may include intended visualization renderings that now have to be modified in view of detected activities. As shown, a synchronization component 650 can be provided to automatically propagate a detected change to the databases 640.

It is noted that various technologies can be provided to synchronize the databases 640 when a detected change has occurred with an underlying visualization model or other data structure. For example, in a human resources application where changes in an organization chart could occur, a technology such as an identity lifecycle (IL) manager could be employed to propagate changes across the databases 640. In this example, the IL manager provides an integrated and comprehensive solution for managing the lifecycle of user identities and their associated credentials across databases. It provides identity synchronization, certificate and password management, and user provisioning that works across other organizational systems/applications. As a result, IT organizations can define and automate the processes used to manage identities from creation to retirement.

Other aspects can include storing entire user history for the model components 630, analyzing past actions over time, storing the patterns, detecting a link between data structures and querying users if they want to maintain synchronization link or not between the data structures. Other monitoring for developing model components 630 include monitoring for biometrics such as monitoring how users are inputting data to further develop the models, analyzing the patterns and relating to a user's profile. If such data were to be considered relevant to the data structures via processing determinations, then further synchronization between databases 640 could be performed.

Figure 7:
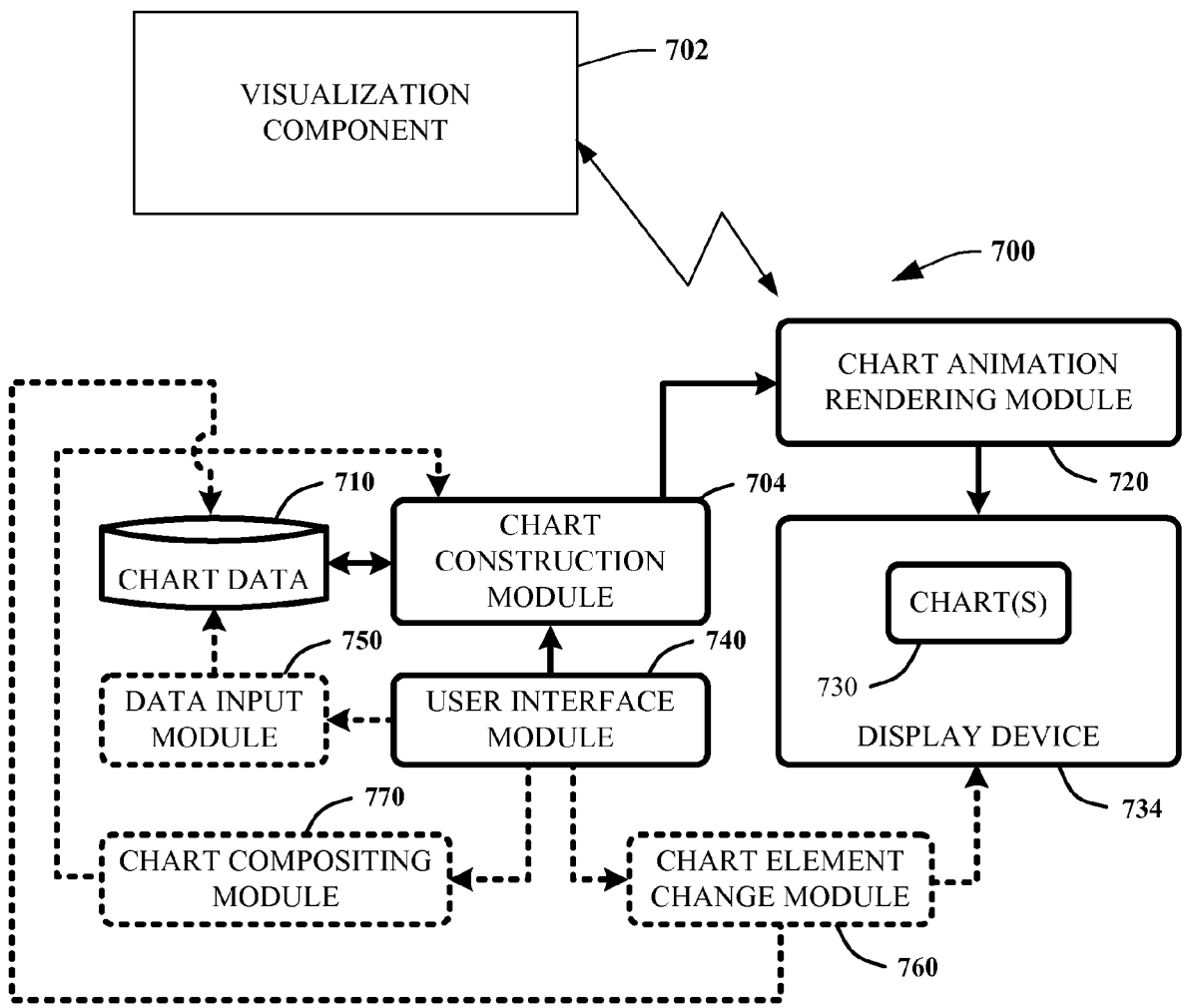
FIG. 7 illustrates an example system for transitioning or morphing between dynamic display visualizations.

Referring to FIG. 7, an example system 700 is illustrated for transitioning or morphing between dynamic display visualizations. As shown, visualization component 702 can receive commands from the system 700 to determine one or more data manipulation commands that may have been initiated via a given rendering or display. In general, a Charting Animator process generally begins operation by using a chart construction module 704 to define parameters used to construct one or more charts (e.g., Pie Charts, Bar Charts, Line Charts, Area Charts, Plateau Charts, etc.) using one or more sets of chart data 710. The chart construction module 704 then provides these parameters to a chart animation rendering module 720 which renders chart(s) 730 on a display device 734 (or surface).

When the chart(s) 730 have been rendered on the display device 704, changes to the rendered chart(s) are enabled using any of several aspects. For example, in one aspect, a user interface module 740 is utilized to modify one or more of data elements comprising the chart data 710 via a data input module 750. Modifications to these data elements include changing the value of one or more of the data elements, adding one or more data elements, and deleting one or more data elements. In general, these data elements are maintained in a conventional computer readable format, such as, for example, in a list, table, database, and so forth. Consequently, direct modifications to the data elements by using a user interface to change the data elements via the data input module 750 can be accomplished using conventional techniques.

When data elements have been modified, the chart construction module 704 determines new chart parameters corresponding to the modified data elements, and passes those chart parameters to the chart animation rendering module 720. At this point, the chart animation rendering module 720 then morphs the existing charts(s) 730 into new chart(s) 730 using a dynamic animation that smoothly transitions from the existing chart(s) to the new chart(s) on the display device 734.

In another aspect, changes to the rendered chart(s) 730 are enabled by directly modifying one or more elements of the chart(s), such as, for example, resizing the height of one or more bars on a Bar Chart, or changing the size of a pie slice in a Pie Chart. In various aspects, direct modification of the elements of the chart(s) is accomplished via the user interface module 740 which allows the user to select one or more individual elements of one or more charts 730 using a graphical user interface provided via a chart element change module 760. This graphical user interface provides a graphical interface to chart(s) 730 being rendered on the display device 734 for resizing, moving, sorting, or deleting one or more of those chart elements. Similarly, chart elements can also be added to one or more of the chart(s) 730 via the graphical user interface provided by the chart element change module 760.

When any chart elements have been modified (by resizing, moving, sorting, deleting, adding, etc.), the chart element change module 760 then automatically modifies the corresponding data elements of the chart data 710 (or adds new values to the chart data) to fit changes made to the chart elements. For example, if a bar in a Bar Chart originally had a value of "10," then that bar was resized via the chart element change module 760 to show a value of "5" on the display device 734, then the chart element change module can change the value of the corresponding data element to "5" in the chart data 710.

Depending upon the chart(s) being displayed, many of the chart elements are often interdependent. Consequently, changes to one data element (either via the data input module 750, or via the chart element change module 760) used to construct the chart will often have an effect either on other data values, or on the displayed chart(s) 730. For example, if a pie slice in a Pie Chart is deleted or resized, or the underlying data value is changed, the other slices in the Pie Chart can be resized so that the Pie Chart retains a full pie shape.

Therefore, when a change to data elements of the chart data 710 occurs (by any mechanism described herein), the chart construction module 704 determines new chart parameters corresponding to the modified data elements, and passes those chart parameters to the chart animation rendering module 720. At this point, the chart animation rendering module 720 then morphs the existing charts(s) 730 into new chart(s) 730 utilizing a dynamic animation that smoothly transitions from the existing chart(s) to the new chart(s) on the display device 734

In yet another aspect, a chart compositing module 770 is accessed via the user interface module 740 for creating a composite chart from two or more existing charts 730. In general, the user can use the chart compositing module 770 to specify (or select from a predefined list) some mathematical relationship between two or more existing charts 230. This mathematical relationship is then used to construct a composite chart by passing composite chart parameters to the chart construction module which in turn passes those parameters to the chart animation rendering module which acts to render the composite chart on the display device as an animation that morphs the existing charts into the composite chart.

Figure 8:
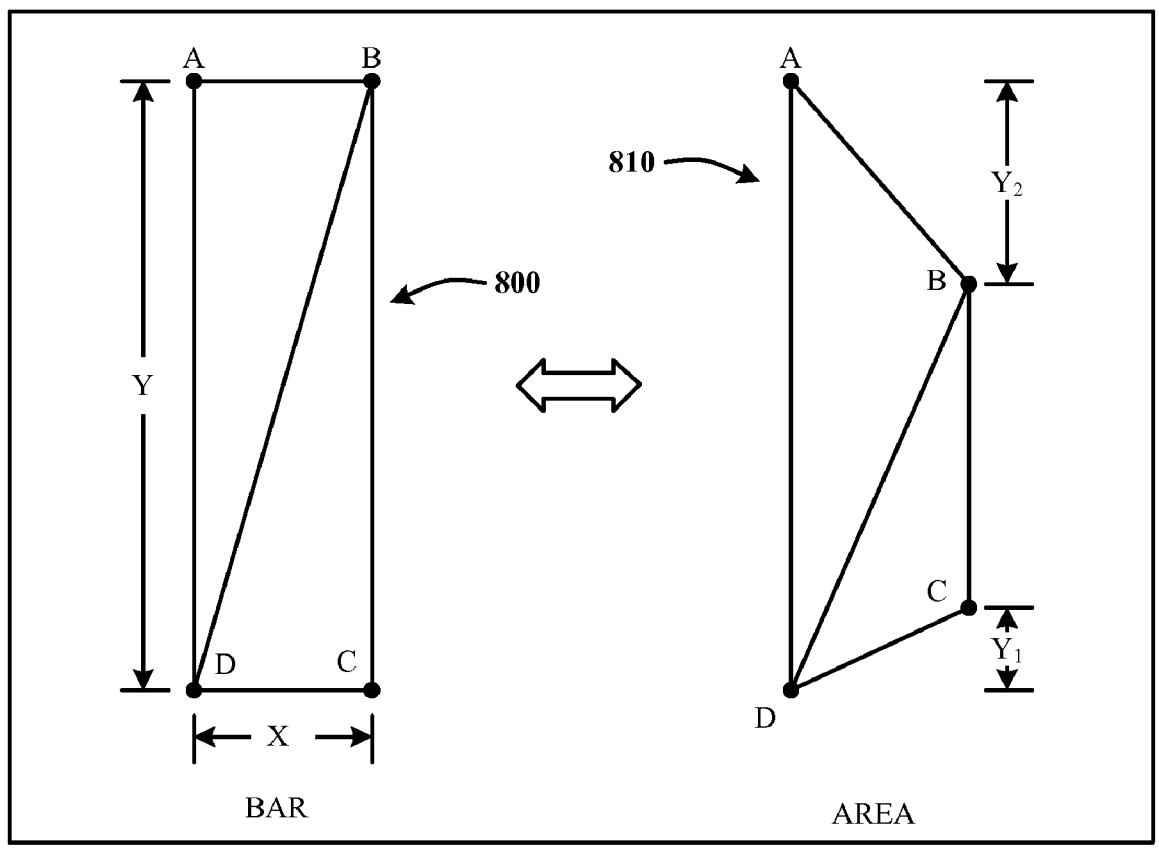
FIG. 8 illustrates an example visualization transition.

Referring to FIG. 8, an example visualization transition is illustrated. In general, the system 700 previously described has the ability to morph chart elements of one shape into chart elements of another shape, such as, for example, morphing to or from a rectangle to a line segment, area segment, or pie slice. This morphing is generally achieved by moving existing points of the various chart elements to create the new shapes, then rendering intermediate shapes to create the animated transition. Further, in addition to moving points to define a new shape, various animation components introduce new points as needed. For example, a pie slice employs many more points than a rectangular bar of a Bar Chart; so, when transitioning from a bar to a pie slice, more points are added—and when transitioning away from a pie slice, those extra points are removed.

Changing the shape of chart elements from one shape to another, such as, for example, changing a rectangular bar of a Bar Chart to a polygon of an Area Chart, or changing a rectangular bar of a Bar Chart to a pie slice of a Pie Chart is achieved by smoothly morphing the chart element from the original shape to the new shape to provide an animated transition between the shapes. This morphing can be accomplished using any of a number of morphing techniques.

For example, in one aspect, as illustrated by FIG. 8, a rectangular bar of a Bar Chart is morphed into a polygon of an Area Chart. Note that this example is not intended to limit the way in which shapes are morphed, and is provided only as a simple illustration of shape morphing techniques that may be utilized by the various animation techniques described or inferred herein.

A rectangle 800 defined by corner points {A, B, C, D} is changed to polygon 810 by translating point B by offset Y2, and translating point C by offset Y2. Clearly, any of the four points of rectangle 800 can be translated in either the X or Y direction to provide the desired shape. Similarly, translating some or all of the points, depending upon the shape, is used for scaling the shape. For example, translating two or more of points A, B and C towards (or away from) point D can be used to scale the size of rectangle 800 either up or down. Further, any one of the four points of rectangle 800 can be collapsed into another of those points to create a triangle from the rectangle 800. In any case, once the points of the new shape have been determined, the animation from the original shape to the new shape is created by simply rendering a sequence of intermediate images in steps as small as one pixel for each point, over some period of time. As can be appreciated, a plurality of various shapes, forms, and associated dimensions can be morphed or transitioned from one shape or form to another.

Figure 9:
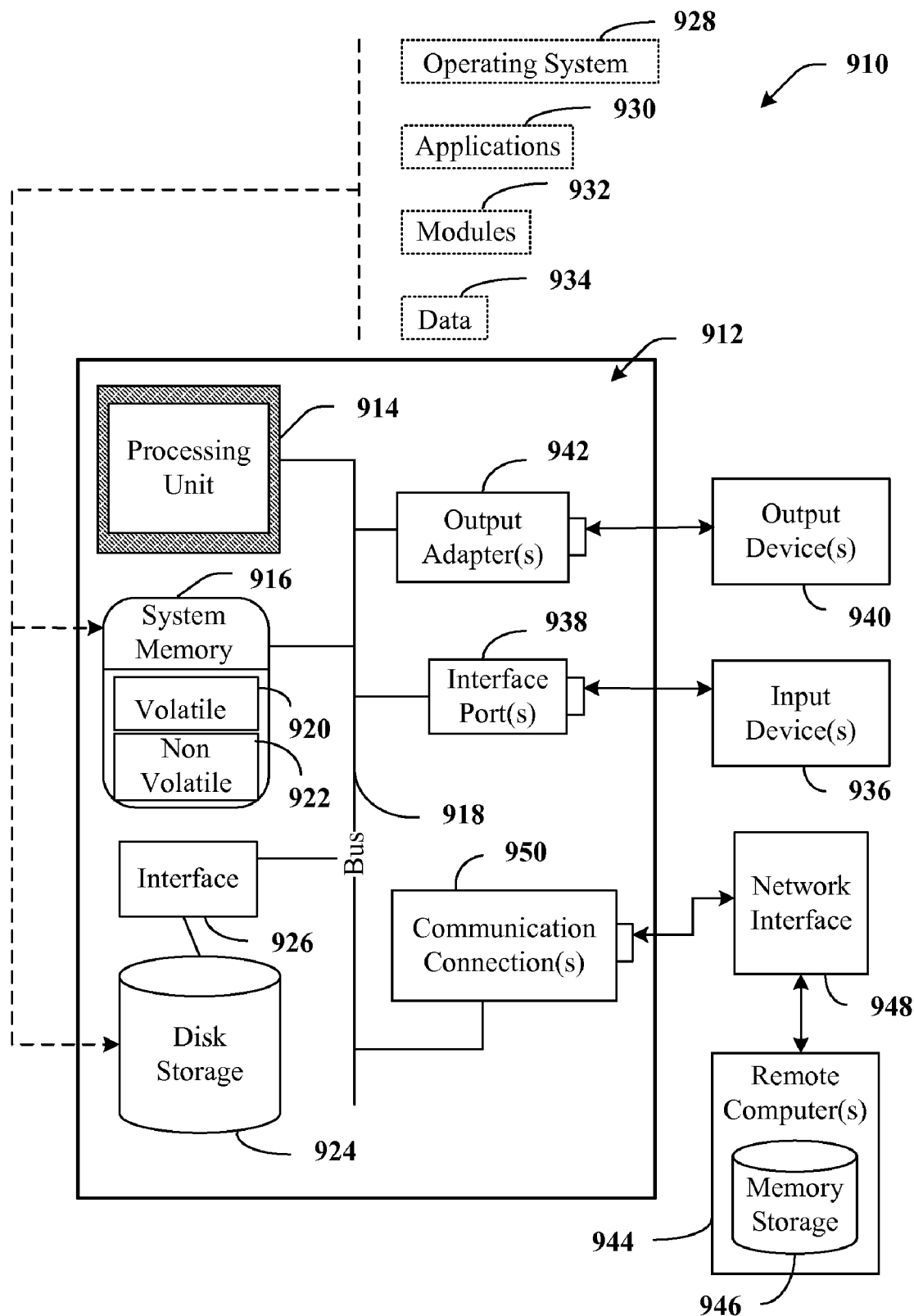
FIG. 9 is a schematic block diagram illustrating a suitable operating environment.
Figure 10:
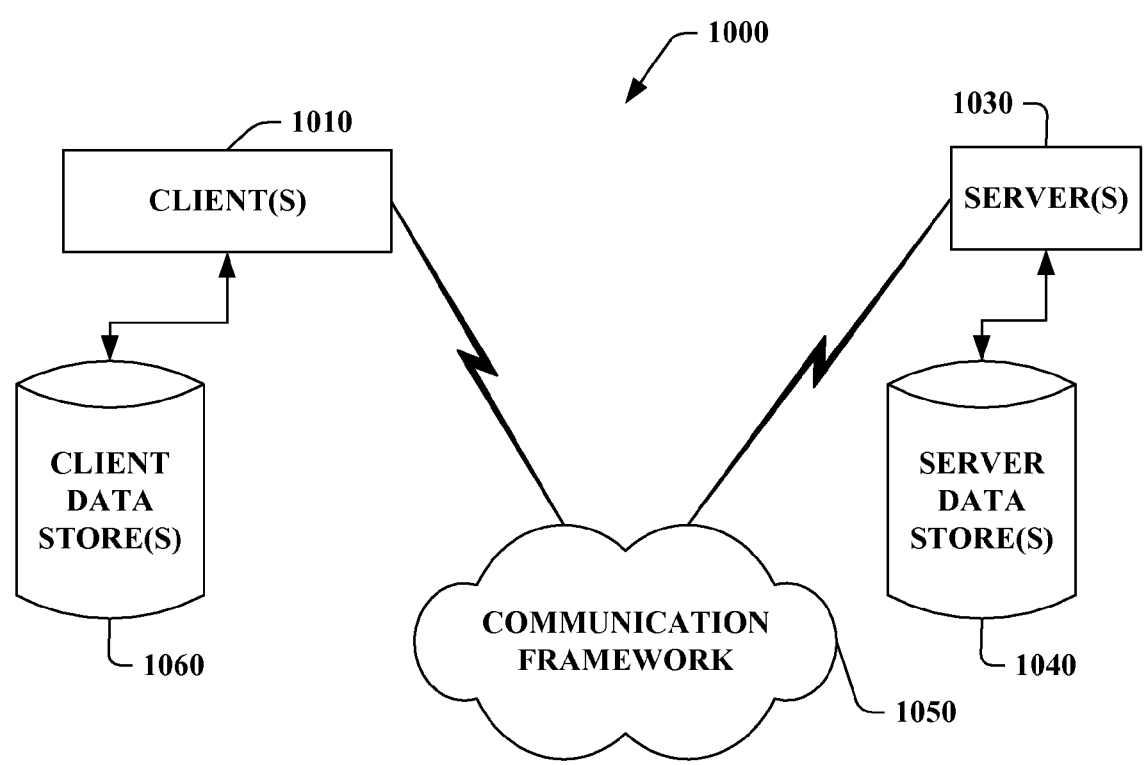
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 64-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030. It is noted that some of the computation may be performed on either side of a network, with a thin visualization being local. Similarly, mobile devices such as a cell phone can be applicable for visualizations since there is only so much screen size, and thus making a decision about what to show is relevant.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A visualization input system comprising:
a processor; and
computer readable media that includes a plurality of software components that are executable by the processor, the software components including:
a visualization component that is executable by the processor to receive gestures and speech as input and to translate the gestures and speech into one or more data manipulation commands;
a distribution component that is executable by the processor to receive the data manipulation commands and propagate data modifications across a plurality of databases in view of the data manipulation commands; and a rights component that that is executable by the processor to implement the data modifications across the plurality of databases, wherein visualizations are buffered in a short term cache to enable authorization of the data manipulation commands from a second user in response to determining that the first user does not have permission to modify the plurality of databases.

2. The system of claim 1, further comprising a feedback component that is executable by the processor to indicate whether or not a user has rights to initiate a data modification.

3. The system of claim 2, wherein the feedback component is further executable by the processor to provide feedback that includes access denied, updating databases, partial access granted, databases affected, submitted for further authorization, or authorization assistance.

4. The system of claim 1, further comprising a gesture component that is executable by the processor to process one or more of an audio stream, a video stream, an e-mail, a query, biometric data, contextual clues, or project related data.

5. The system of claim 1, wherein the data manipulation commands describe changes to an underlying data model, where the changes reflect differences between a starting model state and a subsequent model state.

6. The system of claim 1, wherein the rights component enables change across the plurality of databases, where if rights are granted to at least one database, rights are similarly granted to other databases.

7. The system of claim 6, wherein the rights component operates in conjunction with a host application that calls application logic to determine if a database action is allowable.

8. The system of claim 1, wherein the visualization component operates across multiple visualizations.

9. The system of claim 8, wherein the multiple visualizations are associated with a mash-up object.

10. The system of claim 8, wherein the multiple visualizations are associated with disjointed applications.

11. The system of claim 1, wherein the visualization component is further executable by the processor to combine data sets.

12. The system of claim 1, wherein the visualization component includes a surface of an object as an input mechanism.

13. The system of claim 1, wherein the visualization component includes a multidimensional structure to receive the input.

14. The system of claim 1, wherein the visualization component is further executable by the processor to graphically visualize an approximate chart rendering of a desired goal.

15. The system of claim 1, further comprising a life cycle manager component that is executable by the processor to facilitate distribution of changes across the plurality of databases.

16. A visualization input method comprising:
receiving gestures as input from one or more users;
processing the gestures into one or more data manipulation commands based on the input;
determining whether a first user has permission to modify a plurality of databases;
buffering the one or more data manipulation commands to enable authorization of the data manipulation commands from a second user in response to determining that the first user does not have permission to modify the plurality of databases; and
propagating data modifications across a plurality of databases based on the data manipulation commands in response to determining that the first user has the permission or in response to receiving the authorization from the second user.

17. The method of claim 16, further comprising generating feedback to update a status of a particular data modification.

18. The method of claim 17, wherein the status comprises at least one of access denied, updating databases, partial access granted, databases affected, submitted for further authorization, or authorization assistance.

19. The method of claim 18, further comprising synchronizing two or more databases with changes from a visualization model.

20. A computer readable storage medium having instructions that are executable by a processor to:
receive input that includes hand movements and speech from a first user;
determine one or more data manipulation commands based on the input;
determine access rights associated with a plurality of databases;
determine whether the first user has permission to modify the plurality of databases;
buffer the visualizations in a short term cache to enable authorization of the data manipulation commands from a second user in response to determining that the first user does not have permission to modify the plurality of databases; and
perform data modifications across the plurality of databases based on the one or more data manipulation commands in response to determining that the first user has the permission or in response to receiving the authorization from the second user.

* * * * *